US012392300B1

(12) United States Patent
Liu et al.

(10) Patent No.: US 12,392,300 B1
(45) Date of Patent: Aug. 19, 2025

(54) VEHICLE WITH GASOLINE PARTICULATE FILTER SOOT REGENERATION STRATEGY WITH CRITERIA EMISSION REDUCTION FOR LOW NOX EMISSIONS

(71) Applicant: GM GLOBAL TECHNOLOGY OPERATIONS LLC, Detroit, MI (US)

(72) Inventors: Chengke Liu, Novi, MI (US); Sergio Quelhas, Ann Arbor, MI (US); Rafat F. Hattar, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/750,897

(22) Filed: Jun. 21, 2024

(51) Int. Cl.
*F02D 41/02* (2006.01)
*F01N 1/14* (2006.01)
(Continued)

(52) U.S. Cl.
CPC ....... *F02D 41/029* (2013.01); *F02D 41/1453* (2013.01); *F01N 1/14* (2013.01); *F01N 3/05* (2013.01); *F01N 3/22* (2013.01); *F01N 3/225* (2013.01); *F01N 3/30* (2013.01); *F01N 3/32* (2013.01); *F01N 2270/04* (2013.01); *F01N 2550/12* (2013.01); *F01N 2550/14* (2013.01); *F01N 2900/1804* (2013.01); *F01N 2900/1824* (2013.01); *F02D 2200/0802* (2013.01)

(58) Field of Classification Search
CPC . F01N 1/14; F01N 3/0233; F01N 3/05; F01N 3/055; F01N 3/22; F01N 3/222; F01N 3/225; F01N 3/30; F01N 3/303; F01N 3/32; F01N 3/323; F01N 3/326; F01N 11/007; F01N 13/082; F01N 2270/00; F01N 2270/02; F01N 2270/04; F01N 2270/06; F01N 2270/08; F01N 2270/10; F01N 2550/12; F01N 2550/14; F01N 2560/07; F01N 2570/18; F01N 2610/08; F01N 2610/085; F01N 2610/11; F01N 2900/04; F01N 2900/0412; F01N 2900/0416; F01N 2900/14; F01N 2900/1411; F01N 2900/1804; F01N 2900/1824; F02D 41/029; F02D 41/1453; F02D 2200/0802
See application file for complete search history.

(56) References Cited

U.S. PATENT DOCUMENTS 11,686,264 B1 6/2023 Gwidt et al.
2006/0168947 A1* 8/2006 Durnholz .............. F02D 41/029 60/297
(Continued)

*Primary Examiner* — Binh Q Tran
(74) *Attorney, Agent, or Firm* — Ingrassia Fisher & Lorenz, LLP

(57) ABSTRACT

In accordance with example implementations, a vehicle includes a body, an engine within the body, and at least one exhaust tube extending from the engine and having a particulate filter fluidly coupled to the exhaust tube to receive exhaust material from the exhaust tube. The vehicle also has at least one air injection pipe having a first end with an inlet arranged to receive air flow entering the body while the vehicle is moving, wherein the air injection pipe comprises a second end fluidly coupled to the exhaust tube and having an outlet positioned to provide air flow from the injection pipe into the exhaust tube upstream from the particulate filter. Passive soot regeneration with THC and CO reductions is realized by this introduced air flow.

20 Claims, 6 Drawing Sheets

(51) Int. Cl.

| | |
|---|---|
| ***F01N 3/05*** | (2006.01) |
| ***F01N 3/22*** | (2006.01) |
| ***F01N 3/30*** | (2006.01) |
| ***F01N 3/32*** | (2006.01) |
| ***F02D 41/14*** | (2006.01) |

(56) References Cited

U.S. PATENT DOCUMENTS

2009/0013674 A1* 1/2009 Ono .................... F01N 13/0093 60/311
2011/0265471 A1* 11/2011 Grissom ............... F02B 37/004 123/559.1
2012/0124995 A1* 5/2012 Springer ................. F01N 3/021 60/297
2013/0167810 A1* 7/2013 Roplekar .............. F02B 37/168 123/564
2013/0239800 A1* 9/2013 Yacoub .................. F02M 35/08 55/385.3
2016/0305302 A1* 10/2016 Martin .................... F01N 3/103

* cited by examiner

VEHICLE WITH GASOLINE PARTICULATE FILTER SOOT REGENERATION STRATEGY WITH CRITERIA EMISSION REDUCTION FOR LOW NOX EMISSIONS

INTRODUCTION

The technical field generally relates to vehicles and, more specifically, to methods and systems for controlling particulate filter regeneration for gasoline engines of vehicles.

Many vehicles have exhaust aftertreatment systems with particulate filters to reduce harmful emissions. The particulate filters often require regeneration from time to time due to soot buildup within the filter. However, some existing passive and active regeneration techniques could be improved.

SUMMARY

In an example implementation, a vehicle includes a body, an engine within the body, and at least one exhaust tube extending from the engine and having a particulate filter fluidly coupled to the exhaust tube to receive exhaust material from the exhaust tube. The vehicle also has at least one air injection pipe having a first end with an inlet arranged to receive air flow entering the body while the vehicle is moving. The air injection pipe includes a second end fluidly coupled to the exhaust tube and has an outlet positioned to provide air flow from the injection pipe into the exhaust tube upstream from the particulate filter.

Also in an example implementation, the vehicle includes a valve on the air injection pipe and arranged to be opened and closed depending on a temperature at the particulate filter.

Also in an example implementation, the inlet includes a collector with a free end facing toward a front of the vehicle.

Also in an example implementation, the vehicle includes an air intake manifold with a manifold conduit to direct airflow. The inlet is coupled to the manifold conduit.

Also in an example implementation, the vehicle includes at least one catalytic converter fluidly coupled to the exhaust pipe between the engine and the outlet.

Also in an example implementation, the engine includes two cylinder blocks each with one of the exhaust tubes, and the injection pipe comprises a single inlet and a split into two outlet sections each having one of the second ends and an outlet fluidly coupled to a different one of the exhaust tubes.

Also in an example implementation, the engine includes multiple cylinder blocks, and the at least one exhaust tube comprises two fluidly parallel exhaust pipe sections. Each exhaust pipe section has a first end coupled to a different one of the cylinder blocks and a second end that merges together at a merged exhaust pipe section fluidly coupled to the particulate filter. The injection pipe is coupled to only one of the parallel exhaust pipe sections.

Also in an example implementation, the injection tube has a sidewall with a conical rim defining the outlet.

Also in an example implementation, the vehicle includes temperature sensors of the particulate filter, a valve of the injection pipe, and a controller with at least one processor communicatively coupled to the temperature sensors and the valve. The processor is arranged to operate by controlling the valve to permit air flow through the air injection pipe and to the particulate filter when both temperatures before and after the particulate filter are above a threshold and exhaust pressure in the exhaust tube is less than air pressure at the inlet.

In an example implementation, a method includes obtaining, by processor circuitry forming at least one processor, sensor data indicating a temperature of at least one particulate filter of an emission system of a vehicle. The particulate filter is fluidly coupled to an exhaust tube extending from an engine of the vehicle. Depending on a sensed temperature at the particulate filter, the method includes opening, by the at least one processor, an air injection pipe having an inlet facing forward on the vehicle and disposed to capture under hood airflow entering the vehicle while the vehicle is moving in a deceleration. The air injection pipe includes an outlet fluidly coupled to the exhaust tube between the particulate filter and the engine.

Also in an example implementation, the method includes controlling a maximum air mass flow rate of air to be injected by setting an air injector nozzle diameter at the outlet of the injection pipe and an air collector diameter at the inlet of the injection piper.

Also in an example implementation, the method includes passively activating regeneration of the particulate filter by permitting air flow through the injection pipe when the particulate filter has a temperature of at least 600 deg C. for a non-catalyst particulate filter and 350 deg C. for a catalyst particulate filter.

Also in an example implementation, the method includes passively activating regeneration of the particulate filter by permitting air flow through the injection pipe when the vehicle is decelerating sufficiently to lower exhaust pressure below air pressure at the inlet.

Also in an example implementation, the method includes reducing the THC and CO emissions during a tip-in after deceleration by releasing oxygen stored in catalytic converters during a deceleration dynamic cylinder cut-off (DCCO) event.

Also in an example implementation, the method includes closing the air injection pipe when the particulate filter temperature rises 900 deg C. or 950 deg C.

In an example implementation, an emission system of a vehicle includes at least one exhaust tube extending from an engine of the vehicle and having a particulate filter fluidly coupled on the exhaust tube. At least one temperature sensor is arranged to sense a temperature at the particulate filter. At least one injection pipe has an inlet facing forward on the vehicle and is disposed to capture under hood airflow entering the vehicle while the vehicle is moving in a deceleration. The air injection pipe includes an outlet fluidly coupled to the exhaust tube between the particulate filter and the engine and a valve. Processor circuitry forms at least one processor communicatively coupled to the at least one temperature sensor and the valve, and is arranged to operate by opening and closing the air injection pipe depending on a sensed temperature of the particulate filter.

Also in an example implementation, the emission system comprises a mixer device within the exhaust tube between the outlet and the particulate filter.

Also in an example implementation, the air injection pipe has a sidewall with an opening forming the outlet, and the opening is sized to control an amount of air mass flow rate.

Also in an example implementation, the at least one processor is arranged to operate by opening the air injection pipe when the vehicle is determined to be running in a DCCO event. The air injection pipe may be opened for two seconds or more at a time.

Also in an example implementation, the particulate filter has an inlet temperature sensor and outlet temperature sensor. The at least one processor is arranged to operate by performing a health diagnosis of an air injection system and the particulate filter including determining at least one of: a particulate filter temperature difference between before and after air injections into the particulate filter and at multiple different engine speeds, or particulate filter inlet and outlet temperature differences with and without air injection under different engine speeds.

DESCRIPTION OF THE DRAWINGS

The present disclosure will hereinafter be described in conjunction with the following drawing figures, where like numerals denote like elements and the drawings are not to scale, and where.

DETAILED DESCRIPTION

The following detailed description merely describes example implementations and are not intended to limit the disclosure or the application and uses thereof. Furthermore, no intention exists to be bound by any theory presented in the preceding background or the following detailed description.

Figure 1:
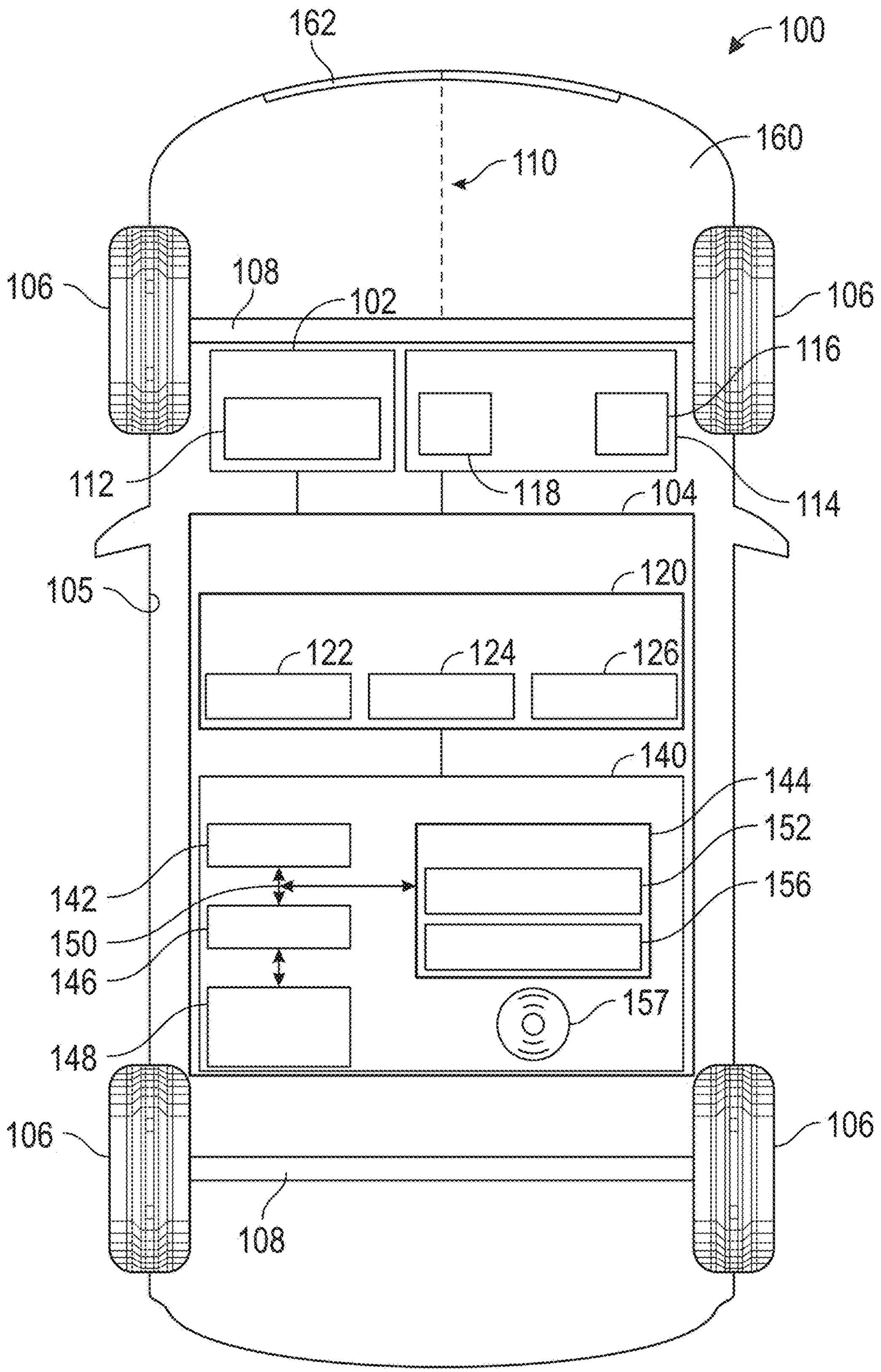
FIG. 1 is a schematic diagram of an example vehicle according to at least one of the implementations herein.

Referring to FIG. 1, an example vehicle 100 has a drive system 102, an emission system 114, and a control system 104. Also as described below in accordance with various implementations, the drive system 102 includes an engine 112, and the emission system 114 has a particulate filter (PF) 116 with an air injection assembly (AIA) 118. The control system 104 controls particulate filter regeneration of the PF via the AIA 118 (for example as described in greater detail below in connection with the vehicle 100 of FIG. 1, and the process 800 of FIG. 8 in accordance with various implementations).

In various implementations, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles. In certain implementations, the vehicle 100 may also comprise a motorcycle or other vehicle, such as an aircraft, spacecraft, watercraft, and so on, and/or one or more other types of mobile platforms (e.g., a robot and/or other mobile platform) that have an emission system.

Figure 2:
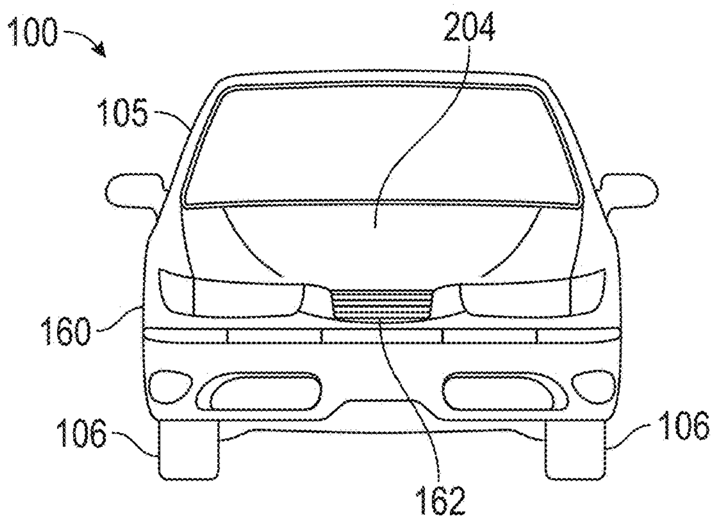
FIG. 2 is a schematic diagram of a front view of the example vehicle of FIG. 1 according to at least one of the implementations herein.

As depicted in FIG. 1, the vehicle 100 includes a body 105 that is arranged on a chassis 110. The body 105 substantially encloses other components of the vehicle 100 and has a front 160 with a front or air grille 162. As shown on FIG. 2, the body 105 may include a hood 204 that covers the engine 112, while the air grille 162 on the front 160 of the vehicle, and in turn in front of engine 112, provides passages for airflow to enter the body from outside of the body and onto or over (or under) the engine 112, referred to herein as under-hood air or air flow. Air may reach the engine 112 and emission system 114 from underneath the body 105 as well as other opening on the body 105. The body 105 and the chassis 110 may jointly form a frame. The vehicle 100 also includes a plurality of wheels 106 and wheel axles 108 coupled thereto. The wheels 106 are each rotationally coupled to the chassis 110 near a respective corner of the body 105 to facilitate movement of the vehicle 100. In one implementation, the vehicle 100 includes four wheels 106, although this may vary in other implementations (for example for trucks and certain other vehicles).

In various implementations, the drive system 102 is mounted on the chassis 110, and drives the wheels 106 via the wheel axles 108. In the depicted implementation, the drive system 102 is a propulsion system that includes the engine 112 as an internal combustion engine 112. The engine 112 is fluidly coupled to the emission system 114. In various implementations, the emission system 114 directs exhaust from the engine 112 to emission reduction devices such as the PF 116 before ejecting the exhaust from the vehicle 100. The PF 116 filters soot in exhaust gases generated by the engine 112 and needs to be periodically regenerated to remove the soot from the PF 116. The present vehicle 100 adds an air injection assembly 118 to the emission system 114 as well as operations of a control system 104 to control the air injection assembly 118. The details are provided below.

Figure 3:
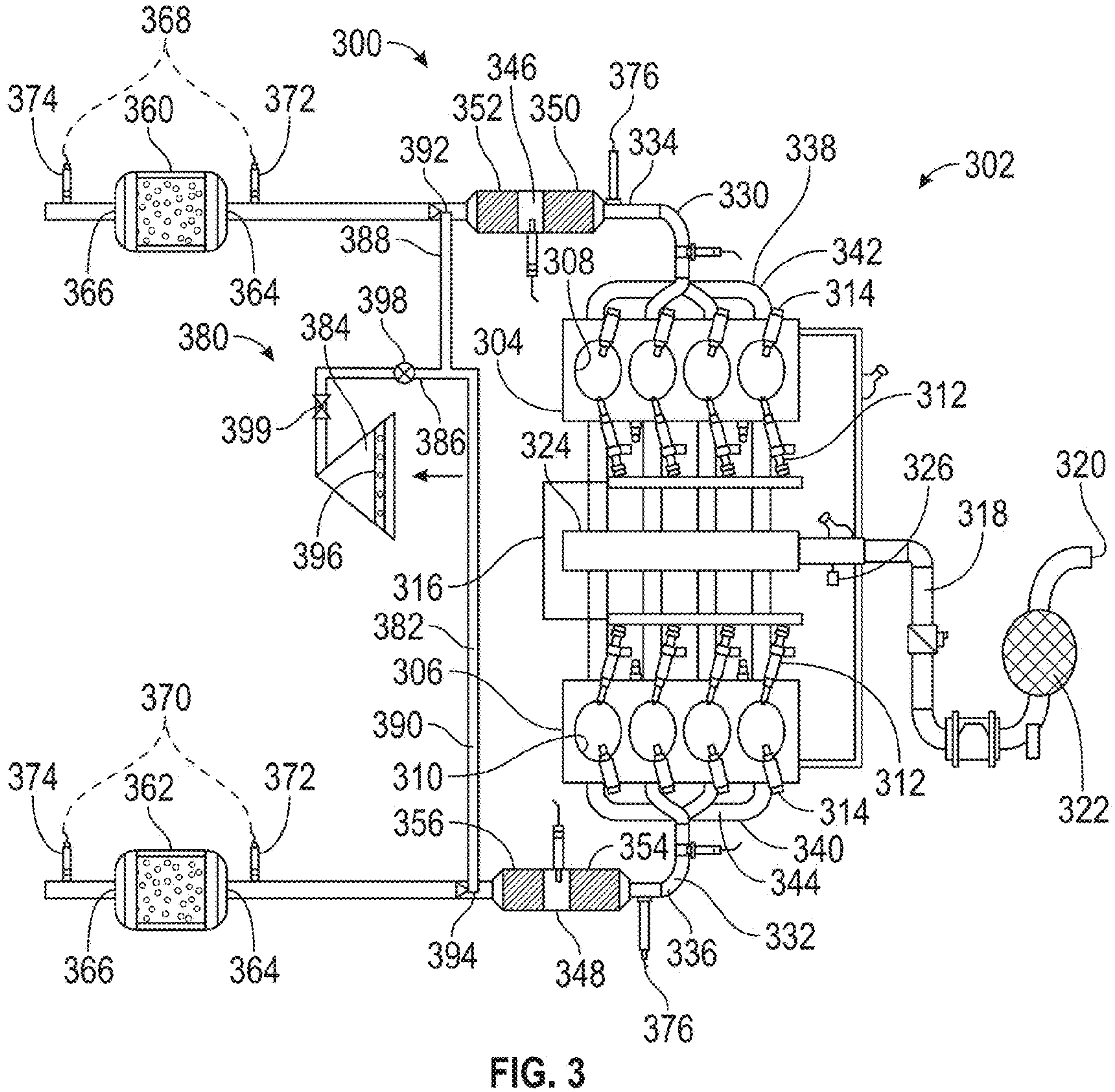
FIG. 3 is a schematic diagram of an example emission system on the vehicle of FIG. 1 according to at least one of the implementations herein.

Referring to FIG. 3, an example emission system 114 of vehicle 100 is the same or similar to emission system 300. The system 300 extends from an engine 302 that may be the same or similar to engine 112. The engine 302 has two cylinder blocks 304 and 306 each with cylinder bores 308 and 310 with spark plugs 314 and fuel injectors 312. A fuel rail 316 delivers fuel to the fuel injectors 312.

An air intake manifold 318 has an inlet (or inlet portion) 320 that directs air through an air filter 322 and then to an arrangement of conduits 324 that directs the air to the cylinder blocks 304 and 306. An air pressure (or intake manifold pressure) 326 monitors the air pressure inside the intake manifold 318. Air and fuel delivered to the cylinder bores 308 and 310 combust and cause pistons (not shown) within the bores to reciprocate within the bores thereby driving a drive shaft, which in turn drives the wheel axles 108 and wheels 106. The engine 302 and components thereof may or may not be considered part of the emission system 300.

As to the emission system 300, one or more (here two) exhaust assemblies 330 and 332 respectively extend back from cylinder blocks 304 and 306, and have respective exhaust tubes 334 and 336 with a branched inlet end 338 and 340 each with branches 342 and 344, respectively, that fluidly couple to a different cylinder bore 308 or 310 to provide an exit for exhaust material from the cylinder bores 308 and 310. It should be noted that the terms tube, pipe, and conduit are used interchangeably herein and refer to members that provide passage for solids, liquids, and/or gases and are not limited to a specific cross-sectional shape (such as circular or cylindrical) unless the context indicates otherwise. Also, it will be appreciated that one or more exhaust valve phasers (not shown) may be on or attached to the engine 302 to control the flow of exhaust gases from the cylinder bores 308 and 310 and into the exhaust tubes 334 and 336.

In this example form, the emission system 300 is a dual catalytic converter, three way catalyst (such as TWC-1) system, although other types of emission systems could be used here instead. In this example, the exhaust tubes 334 and 336 each are fluidly coupled to, or have, a catalytic converter device 346 or 348 downstream (or further back from, in this example) the engine 112, and each catalytic converter device 346 and 348 respectively has a front closed coupled catalytic converter 350 or 352 and a rear closed catalytic converter 354 or 356, although many other types and arrangements of catalytic converter devices can be used instead.

Also in this example implementation, the exhaust tubes 334 and 336 each have a fluidly coupled particulate filter (PF) 360 or 362, and by one example, is a gasoline particulate filter (GPF) that may be a bare PF or catalyst PF. Each PF 360 and 362 has an inlet end 364 and an outlet end 366. Downstream from the PFs 360 and 362, the exhaust tube may fluidly connect to other known components, such as a muffler, before terminating at an outlet (not shown) typically disposed at a rear of the vehicle 100. It will be appreciated that other types of PFs 360 and 362 can be used.

The emission system 300 also has several sensors throughout the system 300 to monitor various parameters of the operation of the system 300. Most relevant here, each PF 360 and 362 has a thermocouple 368 and 370 where each thermocouple has an inlet side exhaust gas temperature (EGT) sensor 372 near the inlet end 364 of the PF 360 and 362, and an outlet side exhaust gas temperature (EGT) sensor 374 near the outlet ends 366 of the PFs 360 and 362. In this example, other pressure and temperature sensors are provided as well, including an EGT sensor 376 upstream from the PFs 360 and 362 by one example, and also upstream from the catalytic converter devices 346 and 348 and downstream from the engine 302.

The emission system 300 has an air injection assembly (AIA) 380, similar to or the same as AIA 118 (FIG. 1), that fluidly couples to the exhaust tubes 334 and 336 to inject air, which may be external air, into the exhaust tubes 334 and 336, and in turn, into the PFs 360 and 362. Specifically, the AIA 380 has an air injection pipe 382, and in this example, in three sections including an inlet section 386 that has an inlet collector 384 and that splits into at least two outlet branches 388 and 390 that each have outlets (or outlet ends) 392 and 394 respectively coupled to a different one of the exhaust tubes 334 and 336. It will be understood that the air injection pipe 382 may have one outlet branch for each exhaust tube being coupled to. Also, by one alternative the outlets 392 and 394 are near, at, or within outlets of the catalytic converter devices 346 or 348.

The air injection pipe 382 of the AIA 380 may be made of steel, mild steel, stainless steel, aluminum steel, composite materials such as carbon fiber or fiberglass-reinforced plastics (FRP), and so forth, as long as the material adequately handles the temperatures and air or gas pressures expected to be experienced by an AIA 380 in an emission system.

The AIA 380 optionally may have an air injection pipe valve 398 that may be an open/close valve, shut-off valve, and so forth that is controlled to completely open or close, but could be a valve, such as a control valve, that has intermediate positions to precisely vary the amount of air flow. The AIA 380 also may have a one way valve 399 to block any undesired reverse flow. The collector 384 has an air filter 396 as well. Other details of the collector 384 are provided at FIG. 6, and other details of the outlets 392 and 394, including an optional nozzle, are provided at FIG. 7.

With this arrangement, the particulate filter 360 or 362 can be passively regenerated when the vehicle is moving in a deceleration mode. Specifically, deceleration may occur when a user is not pressing the accelerator and the vehicle is coasting, or an autonomous drive system control is not injecting fuel into the engine, and this be in a short or transient period as short as two seconds. In other situations, the vehicle may be in a dynamic cylinder cut off (DCCO) mode, where less than all cylinders, or no cylinders, of the engine 112 are used. The DCCO mode is often used to reduce test cycle nitrogen oxide (NOx) emissions. Another situation is a deceleration fuel cut-off (DFCO) mode where fuel injection is momentarily ceased during deceleration to save fuel. While the vehicle 100 is moving forward, these and other deceleration modes cause a situation where exhaust from the engine 112 in the exhaust tubes 334 and 336 have a low exhaust back pressure compared to relatively higher air pressure of relatively high air mass flow rate or air energy of external or ambient air entering into the vehicle body under the hood 204 from the front air grille 162 by one example. Air could also enter under the hood 204 and/or into the air intake manifold 318 from other locations.

The low exhaust pressure permits the air (or more air) to be introduced into the particulate filter (PF) 360 or 362 via the air injection tube 382. The trapped air in the PFs 360 and 362 burn particulate matter (PM), total hydrocarbons (THC), and carbon monoxide (CO) emissions, or in other words soot, at sufficiently high temperatures in the PF 360 or 362. This is a passive rather than active process. This avoids active regeneration that tends to raise NOx emissions instead. The reduction in NOx and soot is accomplished by controlling the air flow rate to the PFs 360 and 362. While the engine 302 is propelling the vehicle, the oxygen stored in the GPF can further reduce HC and CO emissions at the tip-in rich operation. This provides the vehicle 100 with better compliance with governmental vehicle emission regulations. Also, the present passive regeneration can indirectly result in a reduction of consumption of platinum group metals (PGMs) at the catalytic converter devices 346 and 348, creating substantial financial savings.

The low exhaust pressure and high air mass flow rate (or high air flow pressure) causes intake air pressure pulses when the engine cylinders shut off suddenly, which causes the injection of the air to the front of the PF 360 or 362 at the beginning of the deceleration (DCCO) events. In addition, this situation also improves drive quality performance at the tip-in (when the engine is re-activated to propel the vehicle again) after the deceleration events by further releasing or pulsing air in the intake manifold 318 to the PF 360 or 362. In this case, the PF 360 or 362 uses the additional oxygen in the PF 360 or 362 to burn additional THC and CO.

Regarding the valve 398, a controller 140 (FIG. 1) can open and close the valve 398 depending on PF activation and deactivation temperatures, and detection (or assumption) of the lower exhaust pressure, as described in detail below. By an alternative form, however, the valve 398 may be omitted entirely in order to save costs. In this case, the air injection pipe 382 remains open. In the present example, the valve 398 may be an open/close valve or shut-off valve that only has a fully open or fully closed position. In other forms, the valve 398 may have varying positions between open and closed to more precisely control the air mass flow rate as desired.

Referring again to FIG. 1, in various implementations when the control system 104 controls regeneration of the particulate filter (PF) 360 or 362 (or 116) for example, the control system 104 provides instructions or control signals that control the valve 398 to selectively open or close, for example as described in greater detail below in connection with the process 800 of FIG. 8. Also in various implementations, the control system 104 may be coupled to the drive system 102 and emission system 114 to provide various other control functionality for the drive system 102, emission system 114, and/or for various other systems and components of the vehicle 100.

In various implementations, the control system 104 includes a sensor array 120 and the controller 140. In various implementations, the sensor array 120 includes sensors that obtain sensor data pertaining to the emission system 114 and for use in controlling the drive system 102, including the regeneration of the PF 116. In the depicted implementation, the sensor array 120 includes one or more soot sensors 122 and temperature sensors 124. It will be appreciated that in certain implementations the sensor array 120 may also contain any number of other sensors 126 including air or exhaust pressure sensors.

In various implementations, the soot sensors 122 detect a presence, amount, and/or concentration of soot in the PF 116. As used herein throughout this Application, the term "soot" is used to refer to any particles or matter generated by the combustion of the engine 112, including without limitation powdery, flaky, or other carbon substances generated by the combustion. In certain implementations, the soot sensors 122 may comprise one or more pressure sensors, such as a differential pressure sensor or delta P sensor. Otherwise, the temperature sensors themselves may be used to compute pressure, and in turn an indication of the amount of soot in the PF 116. However, this may vary in other implementations, for example in that one or more other sensors may also be utilized in certain implementations.

In various implementations, the temperature sensors 124 include exhaust gas temperature (EGT) sensor thermocouples 368 and 370 (FIG. 3), upstream exhaust temperature sensors 376 (FIG. 3), and others when desired that are configured to measure air temperature of one or more portions of the air of the emission system 114. In various implementations, the temperature sensors 124 are used to measure a temperature of exhaust at the inlet 364 and/or outlet 366 at the PF 360 or 362, for example.

In certain implementations, the sensor array 120 may also include one or more additional types of sensors 126, such as the air intake pressure sensor 326, oxygen sensors, intake manifold air flow sensors, as well as many other sensors as desired such as, by way of example, one or more engine torque sensors, among other different possible types of sensors.

In various implementations, the controller 140 is coupled to the sensor array 120. In various implementations, the controller 140 is also coupled to the drive system 102 and emission system 114. In various implementations, the controller 140 may also be coupled to one or more other systems and/or components of the vehicle 100.

As depicted in FIG. 1, in various implementations the controller 140 comprises a computer system (also referred to herein as computer system 140), and includes processor circuitry forming at least one processor 142, a memory 144, an interface 146, a storage device 148, and a computer bus 150. In various implementations, the controller (or computer system) 140 controls regenerative filtering of the PF 116. In various implementations, the controller 140 controls various other functions of the vehicle 100, including movement of the vehicle 100, and various other functions of the drive system 102 and various other vehicle systems and components. In various implementations, the controller 140 provides these and other functions in accordance with the operations of the process 800 of FIG. 8 and as described further below in connection therewith.

In various implementations, the controller 140 (and, in certain implementations, the control system 104 itself) is disposed within the body 105 of the vehicle 100. In one implementation, the control system 104 is mounted on the chassis 110. In certain implementations, the controller 140 and/or control system 104 and/or one or more components thereof may be disposed outside the body 105, for example on a remote server, in the cloud, or other device where image processing is performed remotely. Thus, it will be appreciated that the controller 140 may otherwise differ from the implementation depicted in FIG. 1. For example, the controller 140 may be coupled to or may otherwise utilize one or more remote computer systems and/or other control systems, for example as part of one or more of the above-identified vehicle 100 devices and systems.

The at least one processor 142 performs the computation and control functions of the controller 140, and may comprise any type of processor or multiple processors, single integrated circuits such as a microprocessor, multiple processor cores, system on a chip (SoC), or any suitable number of integrated circuit devices and/or circuit boards working in cooperation to accomplish the functions of a processing unit.

During operation, the at least one processor 142 executes one or more programs 152 contained within the memory 144 and, as such, controls the general operation of the controller 140 and the computer system of the controller 140, generally in executing the processes described herein, such as the process 800 of FIG. 8 and as described further below in connection therewith. Thus, process 800 may be performed by a program 152 operated by the at least one processor 142 such as a particulate filter (PF) regeneration program or system, and the processor 142 may perform each operation of process 800 by operating a separate unit or module of program 152 that performs individual operations of process 800 by any combination of software, firmware, and/or hardware. It will be understood that a single unit or module of the program 152 may perform multiple operations of process 800. It will be appreciated that one or more of the units of program 152 performing operations of process 800, as well as one or more processors 142, may be remote from vehicle 100 and communicate wirelessly with units or programs 152 that are still onboard to operate the air injection pipe valve 398.

Memory 144 can be any type of suitable memory. For example, memory 144 may include various types of dynamic random access memory (DRAM) such as SDRAM, the various types of static RAM (SRAM), and the various types of non-volatile memory (PROM, EPROM, and flash). In certain examples, memory 144 is located on and/or co-located on the same computer chip as the processor 142. In the depicted implementation, memory 144 stores the above-referenced program 152 along with one or more stored values 156 (e.g., threshold values for controlling particulate filter regeneration).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one implementation, the interface 146 obtains the various data from the sensor array 120. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one example implementation, the storage device 148 comprises a program product from which memory 144 can receive a program 152 that executes one or more implementations of the process 800 of FIG. 8 and as described further below in connection therewith. In another example implementation, the program product may be directly stored in and/or otherwise accessed by the memory 144 and/or a disk (e.g., disk 157), such as that referenced below.

The bus 150 can be any suitable physical or logical structure of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this example implementation is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computing device or computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain implementations. It will similarly be appreciated that the computer system of the controller 140 may also otherwise differ from the implementation depicted in FIG. 1, for example in that the computer system of the controller 140 may be coupled to or may otherwise use one or more remote computer systems and/or other control systems.

Figure 4:
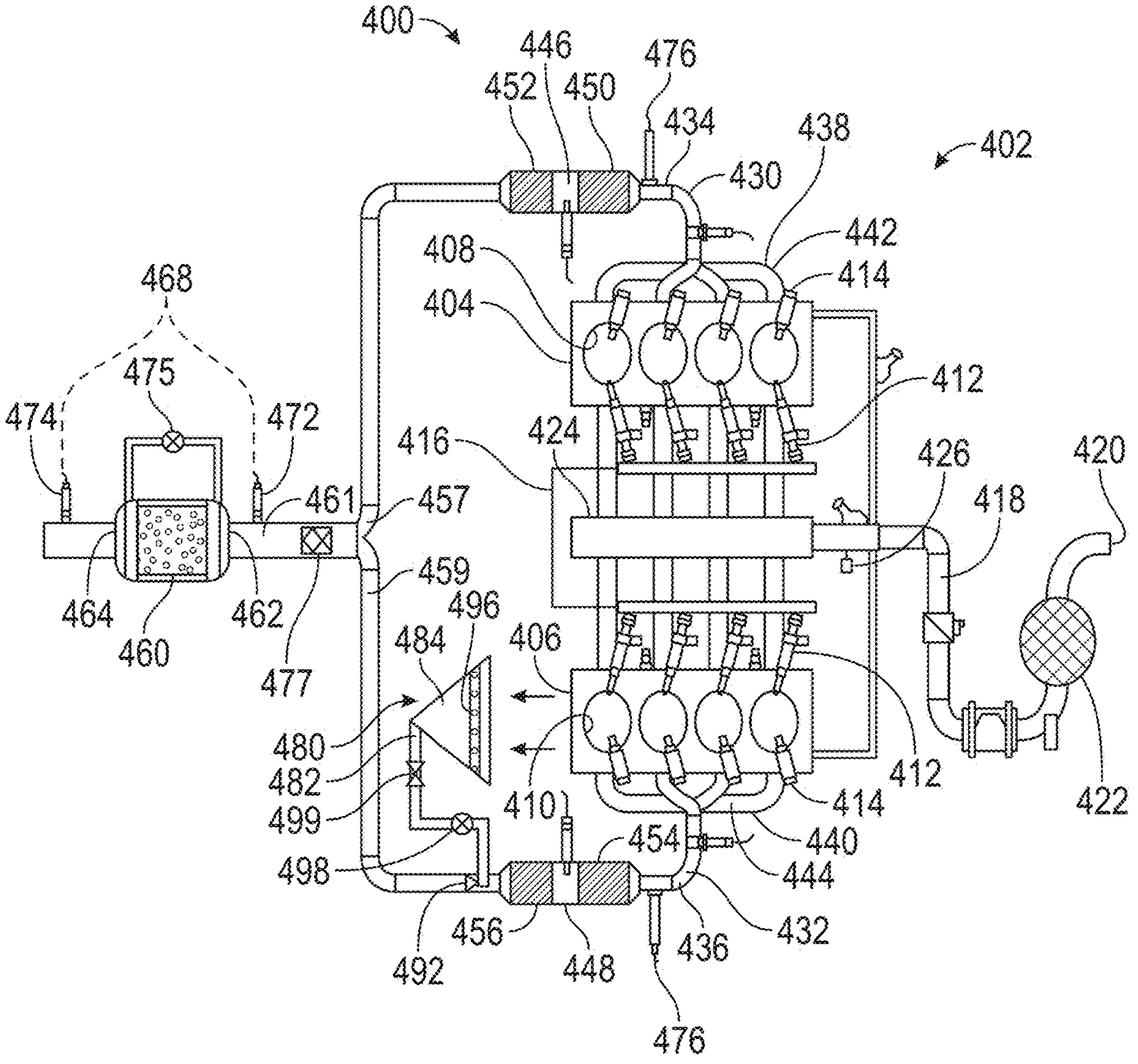
FIG. 4 is a schematic diagram of an alternative example emission system on the vehicle of FIG. 1 according to at least one of the implementations herein.

Referring to FIG. 4, an alternative emission system 400 for vehicle 100 has many of the same or similar parts that are numbered similarly to that already numbered on emission system 300 (FIG. 3) such that these parts need not be described again. Different here, however, exhaust tubes 432 and 434 each have a merging outlet end 457 and 459, respectively that merge together into a single shared or joint exhaust pipe 461 that has one or more shared PFs 460 with an inlet end 462, outlet end 464, and a thermocouple 468 with an inlet temperature sensor 472 and an outlet temperature sensor 474. In this example, the PF 460 also may have a delta P sensor (or other type of pressure sensor) that measures the pressure differential across the PF 460, which can be used to measure an amount of soot at the PF 460. The exhaust pipe 461 may lead to a single GPF and other known exhaust components rather than multiple components for multiple exhaust tubes as in emission system 300 (FIG. 3) in order to reduce financial costs.

In this example with merging parallel exhaust tubes 432 and 434, an air injection assembly (AIA) 480 has an air injection pipe 482 that extends from one of the parallel exhaust tubes 432 or 434 but not both. Similar to air injection assembly 380, air injection assembly 480 has a widened, free end collector 484 as an inlet of the air injection pipe 482, and an outlet 492 fluidly coupled to one of the exhaust tubes 432 or 434 to provide the collected high air mass flow to the PF 460 via the exhaust tube 432 or 434 and exhaust pipe 461. The injected air from one side of the engine bank (or a single exhaust tube 432 or 434) can achieve better mixing, and in turn a better uniformity resulting in air-exhaust gas mixed at the shared or joint pipe 461 entering the PF 460, thereby resulting in more reduction of THC, CO, and PM soot within the PF 460.

The AIA 480 has an open/close (or shut off or other) valve 498 on the air injection pipe 482 to control the air mass flow rate to the PF 460, and a one-way valve 499 to limit reverse flow in the air injection pipe 482. The valve 498 may be controlled by controller 140 and program 152 as described elsewhere herein.

The present arrangement collects and filters the high air mass flow when the vehicle is moving in a low exhaust pressure mode as mentioned above, and the other advantages mentioned above with emission system 300, such as further soot burning upon a tip-in, still apply equally here as well.

By yet another alternative, a mixer device 477, such as a swirl vane or ball-shaped mixer for example, may be placed upstream the inlet 462 of the PF 460 in the joint exhaust pipe 461 to provide further mixing of the injected air and any exhaust gas present to generate an even more homogeneous mixed flow before entering the PF 460.

Figure 5:
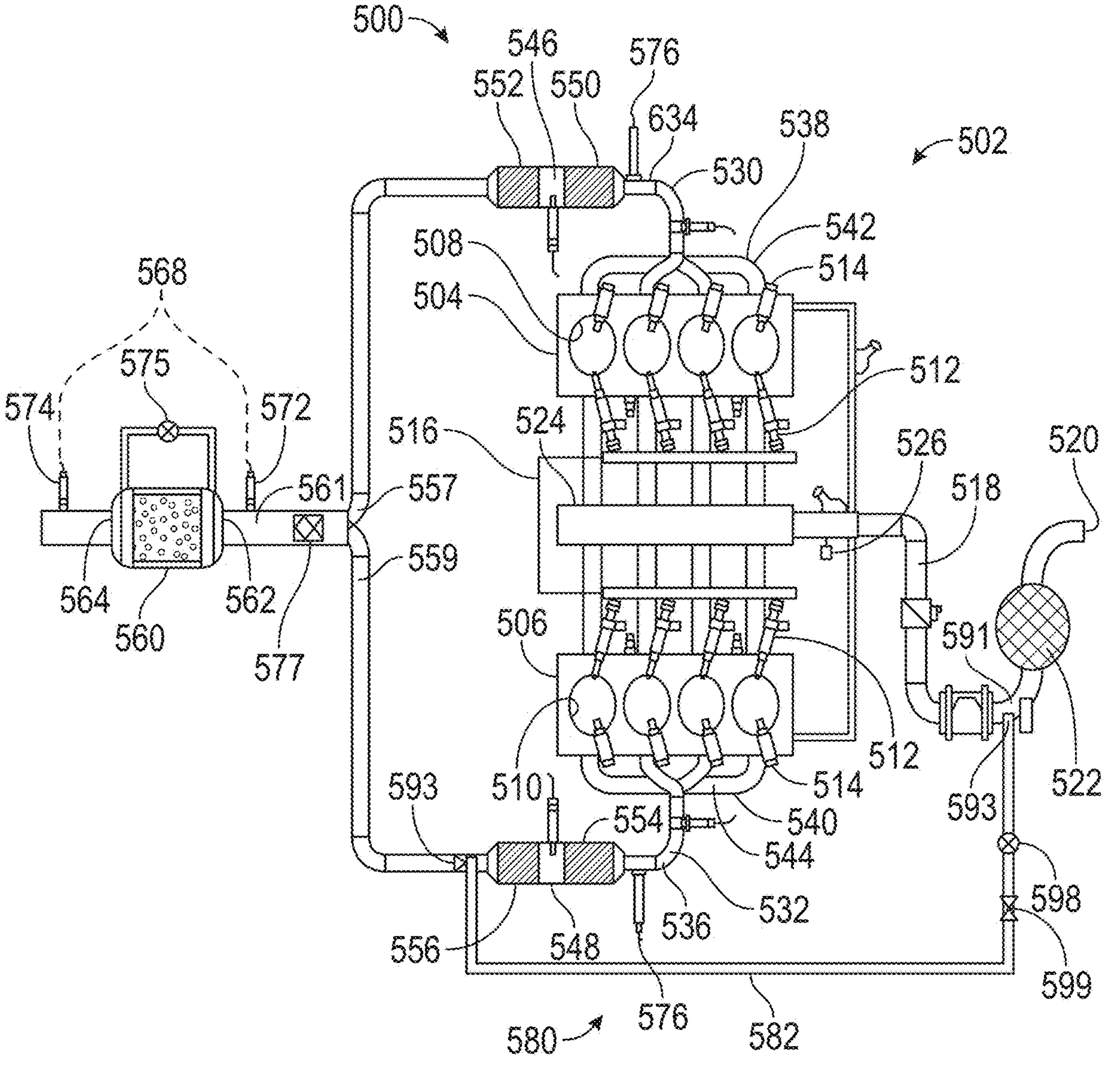
FIG. 5 is a schematic diagram of another alternative example emission system on the vehicle of FIG. 1 according to at least one of the implementations herein.

Referring to FIG. 5, an alternative emission system 500 for vehicle 100 has many of the same or similar parts that are numbered similarly to that already numbered in emission systems 300 (FIG. 3) and/or 400 (FIG. 4) such that these parts need not be described again. Different here, however, an air injection assembly (AIA) 580 has an air injection pipe 582 with an inlet 593 that fluidly couples directly (or fluidly sealed) to a conduit 591 of the air intake manifold 518 rather than using a collector at a free inlet end. The AIA 580 still has a one-way valve 599 and optionally a valve 598 to open or close the air injection pipe 582 as controlled by controller 140 and program 152 for example. Again, many of the advantages of emission systems 300 and 400 of providing a high or good air mass flow rate to the PF during low exhaust pressure also apply here for emission system 500 as well.

Figure 6:
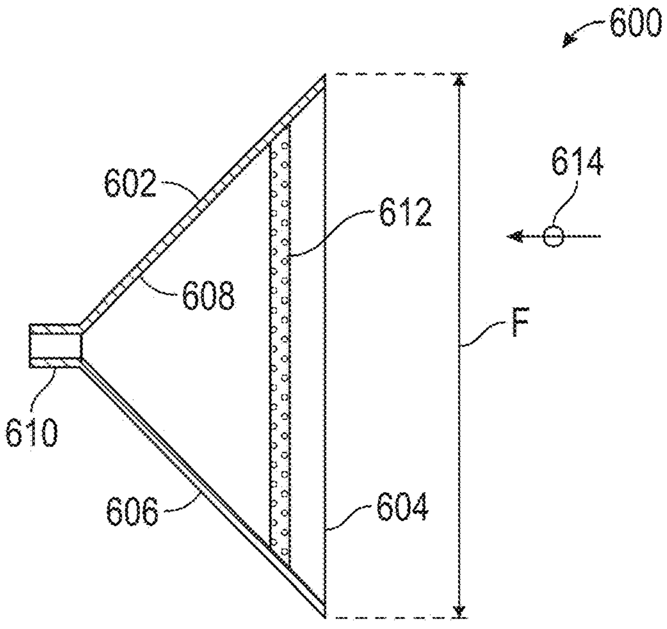
FIG. 6 is a schematic diagram of a cross-sectional view of an air collector according to at least one of the implementations herein.

Referring to FIG. 6, a collector 600, similar or the same as collector 384 (FIG. 3) or 484 (FIG. 4), has a funnel-shaped body 602 with an inlet end 604 to form an inlet of the air injection pipe 382 or 482. The collector 600 also has an opening of the inlet end 604 with an inner diameter or width F that can be sized by experimentation to set or limit a maximum air mass flow rate. A pyramidal sidewall 606 extends from the inlet end 604 to an outlet end 610 for connection to the air injection pipe. An air filter 612, formed of paper, fabric, or other known filter materials, is mounted at an inner surface 608 of the sidewall 606. The inlet end 604 is positioned under the hood of the vehicle to face forward and collect air entering the vehicle under the hood. The inlet end is a free end, which refers to the fact that the free end is not fluidly enclosed in another conduit or air passage to collect ambient or under-hood air. Thus, the inlet end 604 still may be fixed to other structures to limit or stop the motion of the inlet end 604 relative to the vehicle or other components in the vehicle 100.

Figure 7:
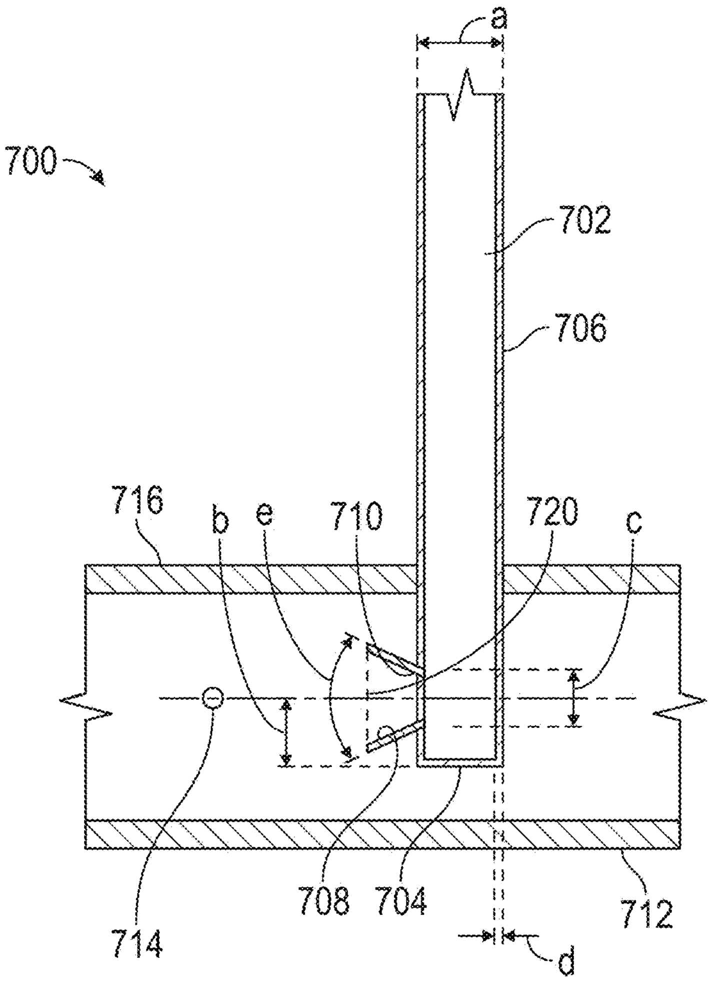
FIG. 7 is a schematic diagram of a cross-sectional view of an air injection pipe according to at least one of the implementations herein.

Referring to FIG. 7, an air injection pipe 700, similar or the same as air injection pipe 382, 482, or 582, has a tubular body 702 that may be made of stainless steel or other material mentioned above. The body 702 is shown here to be straight but need not always be straight. The body 702 has an outlet end 704, here being welded closed. The inlet of the air injection pipe 700 is shown above in FIGS. 3-6. The outlet end 704 has a sidewall 706 with an outlet opening (or outlet or opening) 708 defined by a rim 710. By one form, the rim 710 is circular and slants outward to have a frustoconical surface so that an outer edge of the rim 710 has a larger diameter than a diameter of the inner edge of the rim 710. By one alternative, the outlet 708 is coupled to a nozzle 720, such as by welding, molding, or other attachment, and that is frustoconical with the same or different slope as the rim 710, or finishing a tapered hole. The slop of the rim 710 and/or nozzle 720 directs the injected air to spread when entering an exhaust tube 712. The air injection pipe 700 is shown extending through a sidewall 716 of the exhaust tube 712.

The dimensions of the air injection pipe 700 can be sized to control the air mass flow rate, and may include an outer diameter a and a wall thickness d, an inner diameter c of the outlet 708, a distance b from a centerline 714 of the outlet 708 and a distal end of the outlet end 704, and an included angle e at the frustoconical rim 710 or nozzle 720. By one example form, a=1.0 inch, b=0.4 inches, c=0.5 inches, d=0.3 inches, and e=80 degrees. The dimensions of the injection pipe 700, particularly at the rim 710 and nozzle 720 as well as the diameters at the collector 600, can be sized to set a maximum air mass flow rate to be injected. The air inlet diameters determine how much air is to be trapped at the PF, and the air injection nozzle diameter values determine the flow coefficients that are to be used for the emission system and the air distribution of the air injections.

Specifically for one possible example, the air flow when using a nozzle 720 can be found by computing:

$$m = \frac{Cnozzle * a_{Nozzle} P_1}{\sqrt{RT}} \sqrt{\frac{2\gamma}{\gamma - 1}\left(\frac{P_2}{P_1}\right)^{\frac{2}{\gamma}}\left[1 - \left(\frac{P_2}{P_1}\right)^{\frac{\gamma-1}{\gamma}}\right]} \quad (1)$$

where m is air flow rate (or air mass flow rate), where Cnozzle is the nozzle discharge coefficient, $a_{Nozzle}$ is the cross-sectional area of the nozzle's throat, where $P_1$ and $P_2$ are the upstream and downstream pressures relative to the nozzle respectively, where R is the gas constant J/kg, K, where T is a temperature before the inlet of the PF, and where y is the specific heat ratio. One example way to determine the relationship between $P_1$ and $P_2$ is as follows:

$$P_1 + (1/2)\rho v_1^2 + \rho g h_1 = P_2 + (1/2)\rho v_2^2 + \rho g h_2 \quad (2)$$

where ρ is fluid density, v is fluid velocity, and to include hydrostatic pressure, g is acceleration due to gravity, and h is fluid depth.

Figure 8:
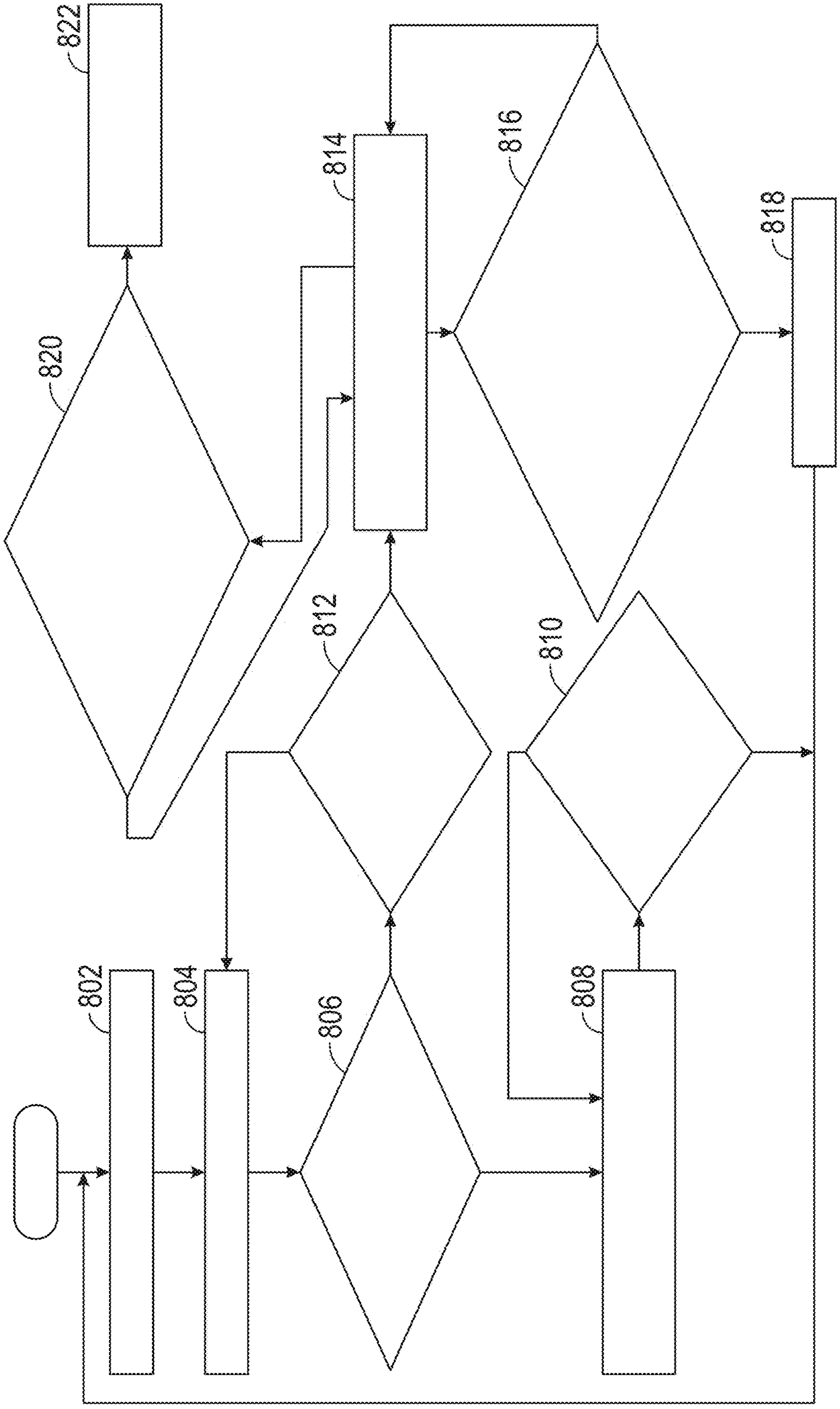
FIG. 8 is a flow chart of a process of particulate filter regeneration for vehicles according to at least one of the implementations herein.

Referring now to FIG. 8, a process 800 of particulate filter regeneration with air injection is described in accordance with example implementations herein. The process 800 is described herein with operations 802 to 822, generally numbered evenly. In various implementations, the process 800 can be implemented in connection with the vehicle 100 of FIG. 1, including the drive system 102, emission systems 114, 300, 400, or 500 of FIGS. 1 and 3-5, the control system 104 of FIG. 1, and components thereof, which are referred to herein where relevant.

The process 800 includes "operate vehicle" 802, and this refers to a first stage with normal operation where it does not matter if the vehicle is accelerating or decelerating, or even in an idle since at this point, the system or process 800 will first check the soot amount in the PFs 116. It will be appreciated that this operation and others of process 800 may be performed continuously in a loop during operation of the vehicle while the vehicle is moving.

The process 800 includes "receive emission parameters" 804, and in various implementations, where sensor data is obtained. In various implementations, sensor data is obtained with respect to the operation of the drive system 102 and emission systems 114, 300, 400, and 500 of FIGS. 1 and 3-5. In various implementations, the sensor data is obtained via sensors of the sensor array 120 and are provided to the processor 142 (FIG. 1) for processing.

Specifically, in various implementations, the sensor data includes engine control module (ECM) data including soot detection data as to the presence and amount of soot (e.g., an estimated volume, mass, and/or percentage concentration thereof) in the particulate filter 116 (FIG. 1). In various implementations, the soot data is obtained via one or more soot sensors 122 (FIG. 1), such as one or more differential pressure sensors such as a delta P sensor since the pressure difference across the PF indicates soot load. Otherwise, one or more temperature sensors (mentioned below) can be used to convert temperature into pressures at the PFs 360 and 362 (or 116) for example. Other types of soot detection sensors may be used as well, and the sensor data provided to the processor 142 for processing.

Also in various implementations, the sensor data of operation 804 further includes temperature data as to one or more temperatures of air along the flow path of exhaust tubes 334 and 336 of FIG. 3 for example. In various implementations, the temperature data is generated from thermocouples 368 and 370 at the PFs 368 and 370, as well as temperature sensors 376 at the upstream ends of the exhaust tubes 334 and 336 near the engine 302. The temperature data is also provided to the processor 142 for processing. In various implementations, the sensor data (including the soot amount data and the temperature data) is collected and used continuously throughout the process 800.

Other sensors 126 may include those that measure engine speed, torque, air flow, coolant, ambient temperature, intake manifold air pressure, and so forth that may be used by the emission system.

By one optional form, particulate filter regeneration is not performed until it is requested. In this example approach, particulate filter regeneration is requested in accordance with instructions provided by the processor 142 when a concentration of soot in the particulate filter 116 exceeds a predetermined threshold that may be stored in the memory 144 as a stored value 156 thereof, or, alternatively, when particulate filter regeneration is warranted, and this includes for both active and passive regeneration.

By the alternative used herein, no such request is used, and a continuous monitoring of the soot in the PF 116 is performed and acted upon. In this case, when the soot amount is high, active regeneration is performed, and when the soot amount is lower, it is assumed at least some soot exists in the PF 116. Then depending on the pressures and temperatures at the emission system as well as the motion of the vehicle (or presence of sufficient air flow), the disclosed passive regeneration with air injection is performed. This process may be performed in a continuous loop as long as the vehicle is moving.

The process 800 includes the inquiry "soot load over active regeneration threshold?" 806. This threshold refers to an amount of soot that is too much for passive regeneration to adequately and efficiently burn off, and the threshold may be determined by experimentation, which may be provided in grams.

If the soot load is too high, the process 800 includes "perform lean active regeneration" 808. Specifically, in various implementations, the processor 142 provides instructions for the heating of the particulate filter 116. In various implementations, the particulate filter 116 is heated to a predetermined temperature (e.g., stored in the memory 144 as a stored value 156 thereof) in order to provide regeneration for the particulate filter 116 (e.g., including burning off of soot in the particulate filter 116). In various implementations, the engine is operated at a slightly lean condition with a delayed post fuel injection to burn the PF soot out of the PF. Also, the active regeneration may be performed as long as the exhaust temperatures at the PF 116 inlet and outlet are below an active regeneration maximum threshold temperature.

The process 800 includes the inquiry "soot loads below threshold of stopping soot regeneration" 810. The soot load is measured periodically during the operation 808, and is stopped once the soot amount is below the threshold of operation 806, although this could be a different threshold when desired. If the soot load is still above the soot load threshold, the process 800 loops back to operation 808 to continue the active regeneration. If the soot load is below the soot load threshold, the process 800 loops back to operation 802 to restart process 800.

When the soot load at operation 806 is found to be below the soot load threshold, process 800 includes the inquiry "exhaust temperature upstream from the PF above activation threshold?" 812. Thus, during operation of the vehicle, the exhaust gases (and/or previous active regeneration) will heat the PF 116. The exhaust temperature upstream from the PF should be above a certain minimum temperature to efficiently ignite the soot at the PF 116 to burn it off. By one form then, the exhaust or a minimum temperature threshold (or passive regeneration activation threshold) is 350 deg C. for a catalyst GPF or 600 deg C. for a bare GPF. By one form, the threshold temperature is a single temperature at the inlet or outlet of the PF 116, but could be both, or some combination. If it is determined that the temperature of the exhaust gas at the PF 116 is below the minimum threshold, then process 800 loops back to operation 804 to continue monitoring for better circumstances for passive regeneration.

Otherwise, if the PF 116 temperature is above the minimum threshold, process 800 includes "start passive air injection when exhaust pressure is lower" 814. Thus, the passive air generation can be performed during deceleration events, such as during DCCO events, DFCO events, and other deceleration events or modes as described above. This may simply involve monitoring when the accelerator is not depressed by a user or when no injection fuel is being injected to the engine cylinders, and so forth. Also as mentioned, this may be performed as long as the inlet and/or outlet exhaust temperatures at the PF 116 are or remain above the activation threshold. The temperature may be continuously monitored.

It should be noted that the passive regeneration may or may not need the air intake manifold to be open, when under-hood air is being used rather than air directly obtained from the air intake manifold. Likewise, the passive regeneration can occur while both intake and exhaust phasers are closed.

Also as mentioned above, the vehicle should be moving to collect under-hood air at relatively high speed (compared to not moving) or in other words, high air mass flow rate, which by some forms, may be at least 5 MPH, but otherwise may be 20-100 or 20 to 80 MPH.

Also, the duration of the deceleration can be very short, such as a minimum of two seconds. By another form, as little as 1 gram of air mass (or pulse of air) may be sufficient to perform passive regeneration with the air injection. Thus, it is sufficient that the passive regeneration with the air injection can be repeated many times all at very short durations when the vehicle is being moved in a way such that only short deceleration durations are available for the passive regeneration with the air injection.

The process 800 includes an inquiry "particulate filter inlet or outlet temperatures or both are above a deactivation (GPF) temperature limit threshold or below a GPF air injection (or activation) temperature threshold?" 816. Thus, when exhaust gas (or air) temperatures are over a maximum GPF limit temperature at or near the PF 116, the soot regeneration should be stopped for safety reasons to avoid damage to the PF 116, fire, or other reasons. By one form, the maximum (or deactivation) temperature threshold is set at 900 deg C. for catalyst PF, and set at 950 deg C. for bare PF. Likewise, when the exhaust temperature is below the activation temperature thresholds from operation 812, the air injection may be stopped at this point as well. For either threshold comparison, the temperature of the exhaust gas (or air) at the PF inlet alone, the PF outlet alone, or some combination of the two may be used to compare to corresponding thresholds. In various implementations, this determination is made based on the temperature values of the exhaust air as measured from the temperature sensors of the thermocouples 368 and 370 as shown on PFs 360 and 362 for example.

If the temperatures still satisfy the thresholds, process 800 loops back to operation 814 to continue the air injection and passive regeneration. If any of the thresholds are not met, then process 800 includes "stop air injection" 818, and the process 800 loops back to operation 802 to operate the vehicle and to restart the regeneration process again.

As yet another alternative in implementations herein, a diagnosis routine to check the status of the particulate filter, referred to herein as a health diagnosis may be performed. For the health diagnosis, the process 800 includes an example inquiry "particulate filter inlet temperature change before and after air injection at different engine speeds less than health thresholds" 820, and this refers to operation of the vehicle at deceleration conditions such as DCCO or DFCO conditions sufficient to result in low exhaust pressure and high air mass flow rate. Alternatively, both the inlet and outlet temperatures at the PF may be used to generate temperature differences instead of just the inlet temperature, and both with and without air injection for both alternatives mentioned. The temperatures may be obtained from the thermocouple sensors described herein, and the temperatures may be compared to thresholds determined during experimentation. The temperatures can be used to determine pressures, which in turn can be used to determine soot loads at the PF. Thereafter, process 800 may include "report air injection status" 822, which refers to at least reporting a system failure when the health thresholds are not met, but otherwise can include reporting an acceptable or pass when thresholds are met.

Accordingly, methods, systems, and vehicles are provided for controlling regeneration for the particulate filter. In various implementations, as discussed above in connection with the process 800 of FIG. 8, passive regeneration with air injection is performed during particulate filter regeneration.

In various implementations, the techniques disclosed herein (including the operations and functions of the process 800 of FIG. 8 and as described above) provides for expanded conditions in which particulate filter regeneration using an air injection pipe are performed. In various implementations, this may result in cleaner air for the exhaust air, and/or other improved performance for the drive system 102 and/or for the vehicle 100.

It will be appreciated that the systems, vehicles, and methods may vary from those depicted in the Figures and described herein. For example, the vehicle 100 of FIGS. 1 and 2, and any of the components of FIGS. 1-7 may differ from that depicted in FIG. 1. It will similarly be appreciated that the operations of process 800 may differ from those depicted in FIG. 8, and/or that various operations of process 800 may occur concurrently and/or in a different order than that depicted in FIG. 8.

While at least one example implementation has been presented in the foregoing detailed description, it should be appreciated that a vast number of variations exist. It should also be appreciated that the example implementation or example implementations are only examples, and are not intended to limit the scope, applicability, or configuration of the disclosure in any way. Rather, the foregoing detailed description will provide those skilled in the art with a convenient road map for implementing the example implementation or example implementations. It should be understood that various changes can be made in the function and arrangement of elements without departing from the scope of the disclosure as set forth in the appended claims and the legal equivalents thereof.

What is claimed is:

1. A vehicle, comprising:

a body;

an engine within the body and comprising two cylinder blocks;

two exhaust tubes, wherein each cylinder block has one of the exhaust tubes, and wherein both of the exhaust tubes having a particulate filter fluidly coupled to the exhaust tube to receive exhaust material from the exhaust tube; and at least one air injection pipe having a first end with a single inlet arranged to receive air flow entering the body while the vehicle is moving, wherein the air injection pipe comprises a split part divided into two outlet sections each having a second end and an outlet fluidly coupled to a different one of the exhaust tubes, and wherein each second end being fluidly coupled to the exhaust tube and having an outlet positioned to provide air flow from the injection pipe into the exhaust tube upstream from the particulate filter.

2. The vehicle of claim 1, comprising a valve on the air injection pipe and arranged to be opened and closed depending on a temperature at the particulate filter.

3. The vehicle of claim 1, wherein the inlet comprises a collector with a free end facing toward a front of the vehicle.

4. The vehicle of claim 1, comprising an air intake manifold with a manifold conduit to direct airflow, and wherein the inlet is coupled to the manifold conduit.

5. The vehicle of claim 1, comprising at least one catalytic converter fluidly coupled to the exhaust tube between the engine and the outlet.

6. An emission system of a vehicle, comprising:

at least one exhaust tube extending from an engine of the vehicle and having a particulate filter fluidly coupled on the exhaust tube;

at least one temperature sensor arranged to sense a temperature at the particulate filter;

at least one injection pipe having an inlet facing forward on the vehicle and disposed to capture under hood airflow entering the vehicle while the vehicle is moving in a deceleration, wherein the air injection pipe comprises an outlet fluidly coupled to the exhaust tube between the particulate filter and the engine and a valve; and processor circuitry forming at least one processor communicatively coupled to the at least one temperature sensor and the valve and arranged to operate by opening and closing the air injection pipe depending on a sensed temperature of the particulate filter, wherein the at least one processor is arranged to operate by opening the air injection pipe when the vehicle is determined to be running a deceleration dynamic cylinder cut-off DCCO event, and wherein the air injection pipe may be opened for two seconds or more at a time.

7. The system of claim 6, wherein the engine comprises multiple cylinder blocks, wherein the at least one exhaust tube comprises two fluidly parallel exhaust pipe sections, each exhaust pipe section having a first end coupled to a different one of the cylinder blocks and a second end that merges together at a merged exhaust pipe section fluidly coupled to the particulate filter, and wherein the injection pipe is coupled to only one of the parallel exhaust pipe sections.

8. The vehicle of claim 1, wherein the air injection pipe has a sidewall with a conical rim defining the outlet.

9. The vehicle of claim 1, comprising temperature sensors of the particulate filter, a valve of the injection pipe, and a controller with at least one processor communicatively coupled to the temperature sensors and the valve, and wherein the processor is arranged to operate by controlling the valve to permit air flow through the air injection pipe and to the particulate filter when both temperatures before and after the particulate filter are above a threshold and exhaust pressure in the exhaust tube is less than air pressure at the inlet.

10. A method, comprising:

obtaining, by processor circuitry forming at least one processor, sensor data indicating a temperature of at least one particulate filter of an emission system of a vehicle, wherein the particulate filter is fluidly coupled to an exhaust tube extending from an engine of the vehicle;

depending on a sensed temperature at the particulate filter, opening, by the at least one processor, an air injection pipe having an inlet facing forward on the vehicle and disposed to capture under hood airflow entering the vehicle while the vehicle is moving in a deceleration, wherein the air injection pipe comprises an outlet fluidly coupled to the exhaust tube between the particulate filter and the engine passively activating regeneration of the particulate filter by permitting air flow through the injection pipe when the vehicle is decelerating sufficiently to lower exhaust pressure below air pressure at the inlet; and reducing the total hydrocarbons (THC) and CO emissions during a tip-in after deceleration by releasing oxygen stored in the catalytic converters during a deceleration dynamic cylinder cut-off (DCCO) event.

11. The method of claim 10, comprising controlling a maximum air mass flow rate of air to be injected by setting an air injector nozzle diameter at the outlet of the injection pipe and an air collector diameter at the inlet of the injection pipe.

12. The method of claim 10, comprising passively activating regeneration of the particulate filter by permitting air flow through the injection pipe when the particulate filter has a temperature of at least 600 deg C. for a non-catalyst particulate filter and 350 deg C. for a catalyst particulate filter.

13. The system of claim 6, comprising passively activating regeneration of the particulate filter by permitting air flow through the injection pipe when the vehicle is decelerating sufficiently to lower exhaust pressure below air pressure at the inlet.

14. The system of claim 13, comprising reducing the total hydrocarbons (THC) and CO emissions during a tip-in after deceleration by releasing oxygen stored in the catalytic converters during a deceleration dynamic cylinder cut-off (DCCO) event.

15. The method of claim 11, comprising closing the air injection pipe when the particulate filter temperature rises above 900 deg C. or 950 deg C.

16. The system of claim 6, wherein the engine comprises two cylinder blocks each with one of the exhaust tubes, and wherein the injection pipe comprises a single inlet and a split part divided into two outlet sections each having one of the second ends and an outlet fluidly coupled to a different one of the exhaust tubes.

17. The system of claim 16, wherein the emission system comprises a mixer device within the exhaust tube between the outlet and the particulate filter.

18. The system of claim 16, wherein the air injection pipe has a sidewall with an opening forming the outlet, and wherein the opening is sized to control an amount of air mass flow rate.

19. The system of claim 16, wherein the particulate filter has an inlet temperature sensor and outlet temperature sensor, and wherein the at least one processor is arranged to operate by performing a health diagnosis of an air injection system and the particulate filter comprising determining at least one of:

a front particulate filter temperature difference before and after air injections into the particulate filter and at multiple different engine speeds, or particulate filter inlet and outlet temperature differences with and without air injection under different engine speeds.

20. The system of claim 18, wherein the air injection pipe has a sidewall with a conical rim defining the outlet.

* * * * *